United States Patent [19]

Palm

[11] Patent Number: 4,687,385

[45] Date of Patent: Aug. 18, 1987

[54] PORTABLE HOLE CUTTING POWER TOOL

[75] Inventor: Bernhard Palm, Brookfield, Wis.

[73] Assignee: Milwaukee Electric Tool Corporation, Brookfield, Wis.

[21] Appl. No.: 720,860

[22] Filed: Apr. 8, 1985

[51] Int. Cl.[4] .............................................. B23B 45/14

[52] U.S. Cl. .......................................... 408/76; 269/8; 408/56; 408/129; 408/710; 408/712

[58] Field of Search ....................... 408/36, 56, 57, 58, 408/59, 60, 61, 76, 129, 135, 136, 710, 712, 130, 710, 241 R; 409/231, 232, 234, 135, 136; 279/1 B, 1 Q, 1 M; 269/8; 417/476; 74/142, 525; 33/DIG. 1; 335/285, 295

[56] References Cited

U.S. PATENT DOCUMENTS

| | | | |
|---|---|---|---|
| 2,188,631 | 1/1940 | Kraus | 408/59 |
| 2,249,395 | 7/1941 | Reese | 408/56 |
| 2,492,238 | 12/1949 | Roof | 335/295 |
| 2,651,264 | 9/1953 | Bruckman | 417/76 X |
| 2,748,630 | 6/1956 | Dillon | 408/61 |
| 2,813,280 | 11/1957 | Huffman | 408/36 X |
| 2,888,617 | 5/1959 | Baumet | 335/295 |
| 3,010,054 | 11/1961 | Goudsmit | 269/8 X |
| 3,231,789 | 1/1966 | Engelsted | 269/8 X |
| 3,658,351 | 4/1972 | Benjamin et al. | 279/1 B |
| 3,689,168 | 9/1972 | Perrson | 408/61 |
| 3,818,399 | 6/1974 | Edwards | 335/295 |
| 3,884,592 | 5/1975 | Shulters | 408/129 X |
| 4,171,821 | 10/1979 | Miller | 279/1 Q X |
| 4,261,673 | 4/1981 | Hougen | 408/135 X |
| 4,278,371 | 7/1981 | Meyer | 408/76 |
| 4,303,054 | 12/1981 | Lore | 33/DIG. 1 X |
| 4,322,189 | 3/1982 | Briese | 408/59 X |
| 4,408,935 | 10/1983 | Miyanaga | 408/56 X |
| 4,419,644 | 12/1983 | Baermann | 335/295 X |
| 4,582,456 | 4/1986 | Imai | 408/136 |
| 4,591,301 | 5/1986 | Pelfrey | 408/76 |

*Primary Examiner*—Gil Weidenfeld
*Assistant Examiner*—Glenn L. Webb
*Attorney, Agent, or Firm*—Bayard H. Michael

[57] ABSTRACT

The power tool has a magnetic base with superimposed permanent magnet assemblies. The upper assembly can be moved relative to the lower assembly to shunt or reinforce the magnetic field. When the sensing probe is pushed into the base the electric motor can be switched on to rotate a spindle on which a rotary cutting tool is axially mounted. The tool feed is controlled by a handle which can be mounted on either side of the tool housing. A coolant reservoir on the base has a hose connected to a pump which is connected to a manifold supplying coolant to the interior of the cutting tool. The cutting tool is biased upwardly and pinches off the coolant when the tool is raised from the work.

6 Claims, 12 Drawing Figures

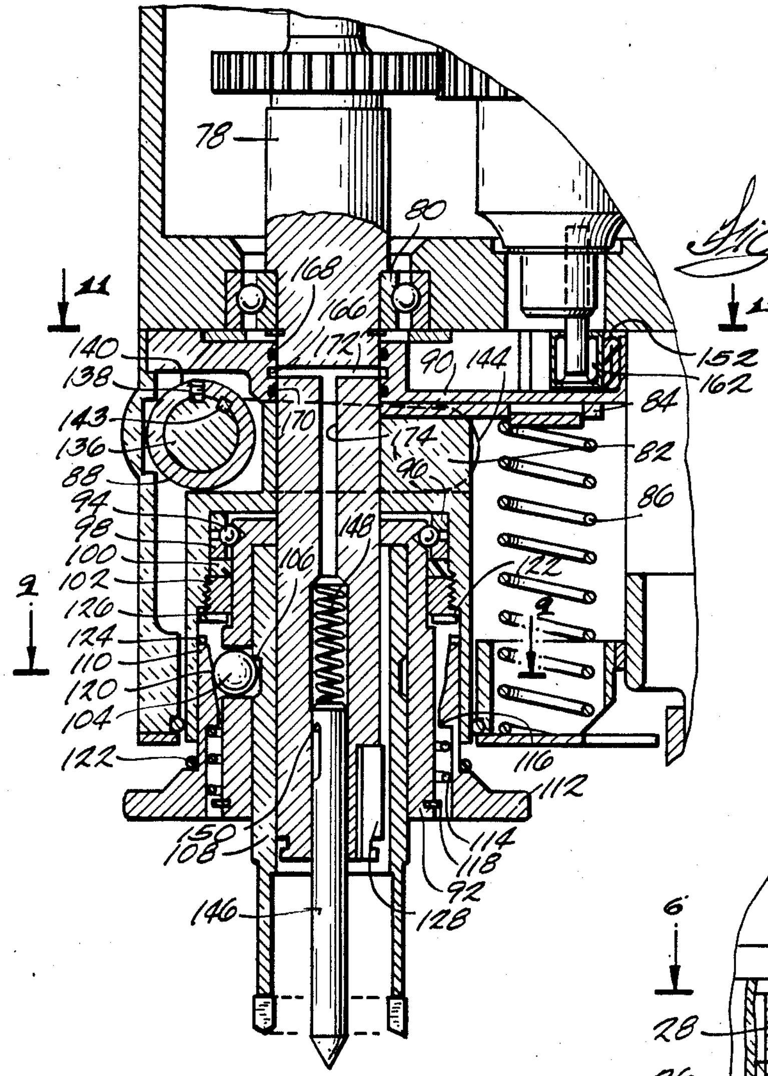
Fig. 8
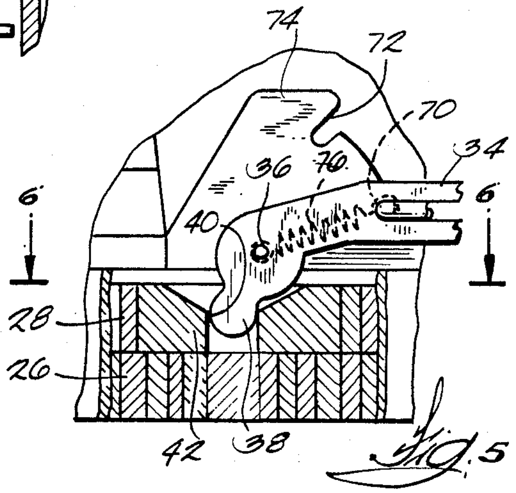
Fig. 5
Fig. 9
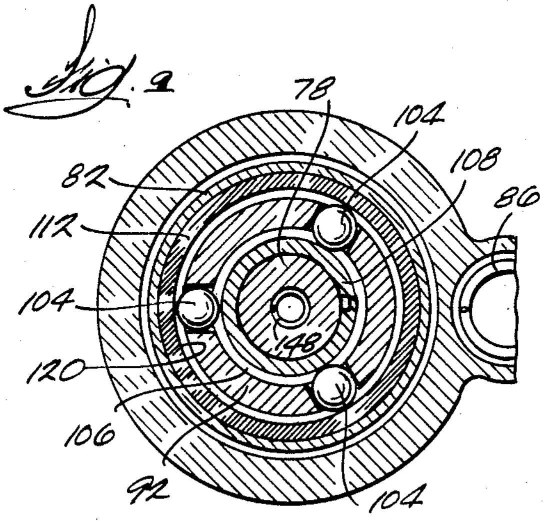
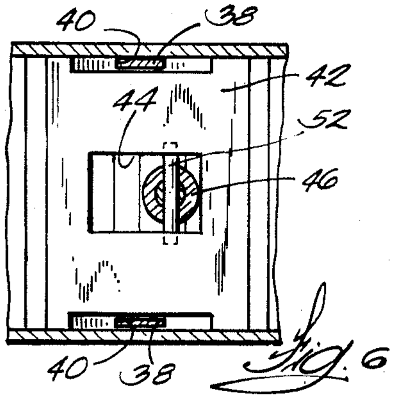
Fig. 6

PORTABLE HOLE CUTTING POWER TOOL

FIELD OF THE INVENTION

This invention relates to a portable hole cutting power tool having a magnetic base for securing the tool to ferromagnetic material.

BACKGROUND OF THE INVENTION

There are portable drill presses which have an electromagnetic base which, when energized, will hold the base securely to ferromagnetic material. A motorized head unit can be fed relative to the base to advance a drill or a hole cutter into the material, usually the same material as that on which the drill press is mounted.

Electromagnetic drill presses must have safety interlocks to avoid operation in the event there is inadequate or no electromagnetic force holding the press to the iron. Furthermore, since any electromagnetic arrangement is subject to loss of attractive force on power failure, the drill press should be restrained against falling, particularly when mounted on a vertical or overhead surface, thus protecting both the tool and the operator if there should be a power failure (and a power failure can be caused by a co-worker kicking the power cord and pulling it out of the wall).

Another problem encountered with the drill press is that it requires a considerable vertical height and, due to the nature of the electromagnetic base, it requires a fairly substantial amount of iron to develop an adequate holding force. Thus, it is not particularly useful on metal cabinets, duct work and the like where the steel is relatively thin.

SUMMARY OF THE INVENTION

An important feature of this invention is the provision of a portable power tool having a magnetic base which can be energized or deenergized to hold the tool to the work. The tool has provision for advancing a hole cutting tool into the work.

Another feature is to provide such a tool in which the motor drives a spindle which does not move axially. A hole cutter is mounted on the spindle for movement to and from the material being holed. This results in reduced vertical height for a hole cutting tool as compared to the prior art electromagnetic drill press.

A further feature of this invention is the inclusion of a coolant reservoir and means for dispensing the coolant to the cutting tool at a controlled rate.

Still another feature is the provision of means preventing actuation of the motor switch unless the magnetic field of the base has been enabled and the base is resting on a surface. Should the tool be knocked off the work surface, the safety means immediately deenergizes the motor circuit.

A further feature of the invention is the provision of such a portable power tool with a magnetic base made up of a multiplicity of spaced permanent magnets having fields which can be placed in opposition to eliminate the magnetic attraction to an iron work surface. The magnetic fields can be positioned to be additive to hold the tool to the iron with great force. The force is distributed by multiple poles so that the tool can be retained on rather thin sheet metal. Since the magnetic field is developed by a permanent magnet the tool is secured against loss of grip on power failure.

CROSS REFERENCES TO RELATED APPLICATIONS

Various features described herein are claimed in separate applications. The mounting and drive for the quick change hole cutter is claimed in application Ser. No. 720,859, U.S. Pat.No. 4,626,152. The coolant dispensing mechanism is claimed in application Ser. No. 720,861. The details of the interlocking switch and magnetic field operation are claimed in application Ser. No. 720,899, U.S. Pat. No. 4,639,170. The structure enabling mounting the tool feed handle on either side of the machine is claimed in application Ser. No. 720,858, U.S. Pat. No. 4,610,580.

BRIEF DESCRIPTION OF THE DRAWINGS

FIG. 5 is a detailed section showing how the lever/-handle actuates the upper magnet assembly.

FIG. 6 is a section on line 6—6 in FIG. 5.

FIG. 8 is an enlarged section through the hole cutting too, the feed assembly and the drive spindle.

FIG. 9 is a section on line 9—9 in FIG. 8.

DETAILED DESCRIPTION OF THE DRAWINGS

Figure 2:
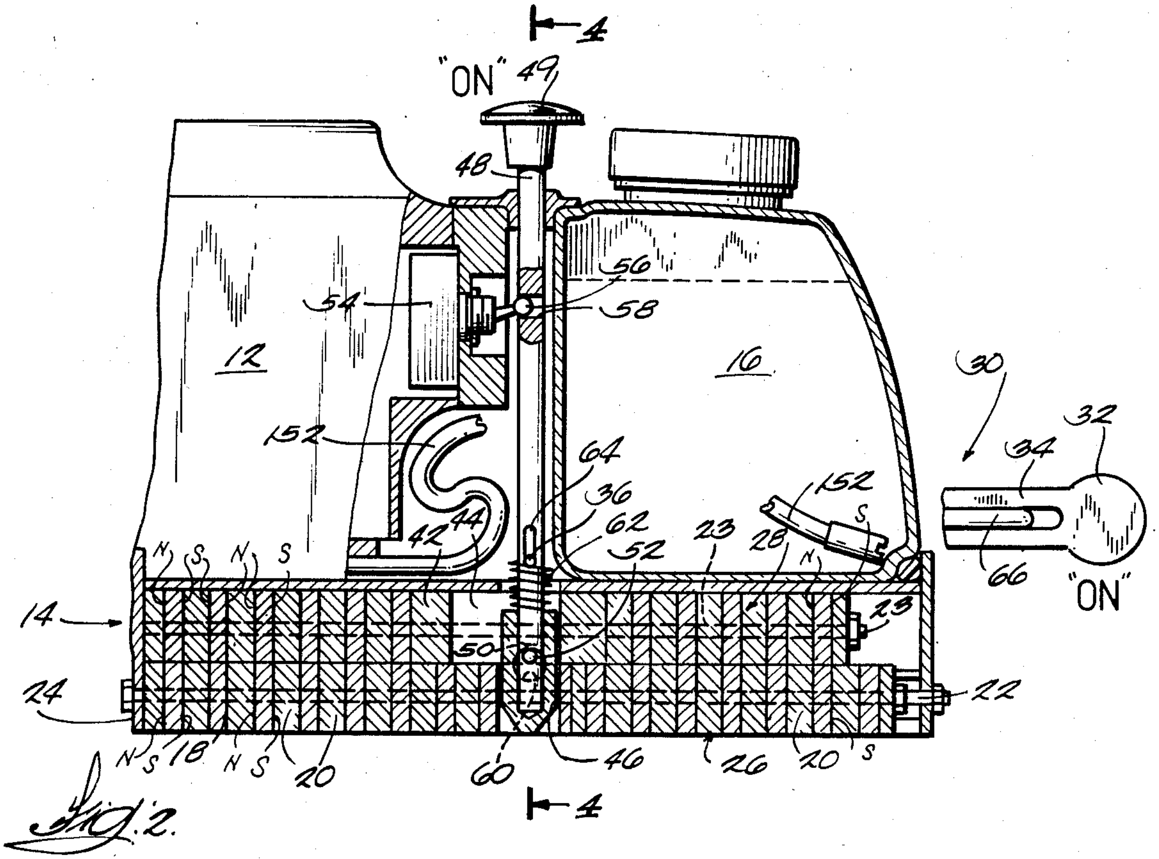
FIG. 2 is an enlarged detailed section showing the magnetic base structure with the magnetic fields reinforcing.
Figure 3:
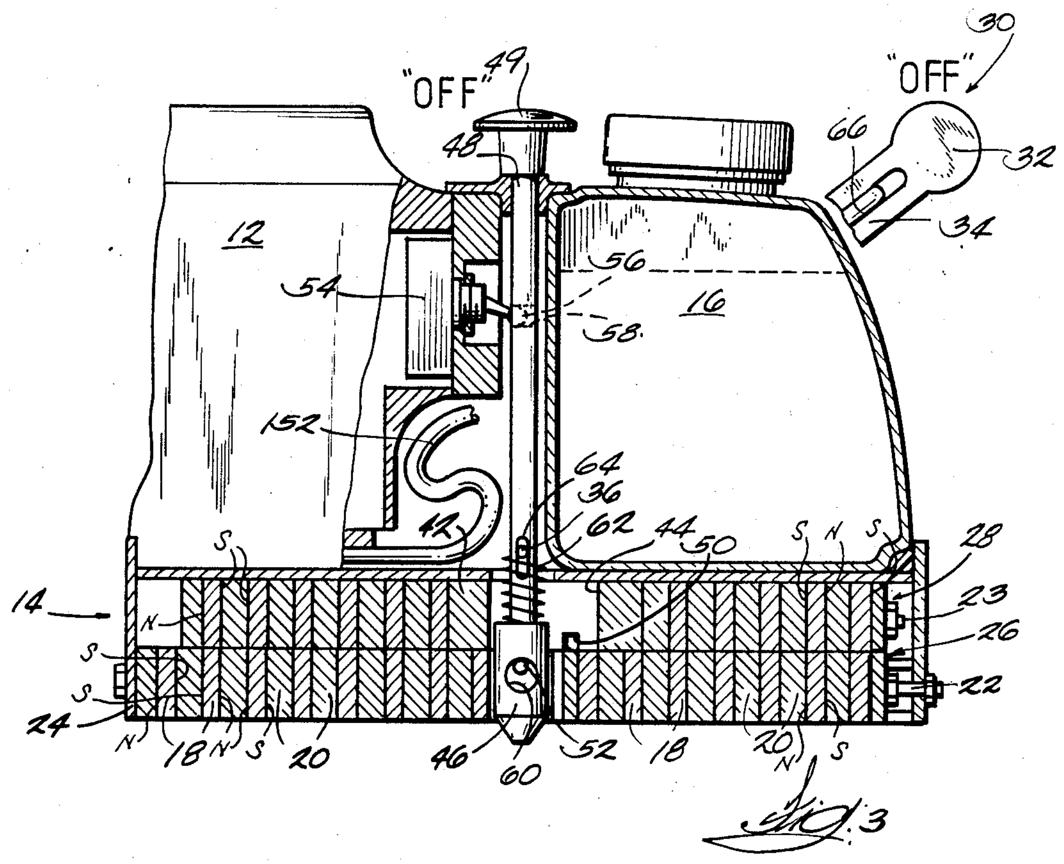
FIG. 3 is similar to FIG. 2 but the magnetic fields cancel in this view.

The portable hole cutting tool 10 includes a motor housing 12 mounted on a magnetic base 14 with a coolant reservoir 16 secured to the base behind the housing 12. The magnetic base has two permanent magnet assemblies 26, 28 with one (28) mounted on top of and movable relative to the bottom assembly 26. As seen in cross section, the thin parts 18 are the permanent magnets while the thick plates 20 are the ferromagnetic material, i.e., steel. The magnets are magnetized so that confronting faces of the magnets have similar polarities as indicated in the drawings. The alternating magnets and steel pieces in the lower assembly 26 are tied together by tie rods 22 running the length of the assembly and through the ends 24 of the base 14. The upper assembly is tied by rods 23. The tie rods 22, 23 straddle the sensor structure 46 to be described. When the upper magnetic assembly 28 is positioned as shown in FIG. 2, the upper magnets are aligned with the lower magnets of similar polarity. Thus, the steel pieces between the upper and lower magnets are alternately North and South and this will set up a magnetic field attracting the base of the tool to ferromagnetic material contacting the base. The upper magnet assembly is slightly shorter than the lower magnet assembly so there is always some flux effective even when the upper magnetic assembly is shifted to the right by a distance adequate to align the upper magnets with lower magnets of opposite polarization as shown in FIG. 3 and the fields of the upper and lower assemblies substantially shunt each other leaving only a small net force holding the tool on the work surface. This is desirable because it improves the handling characteristics of the tool.

Figure 4:
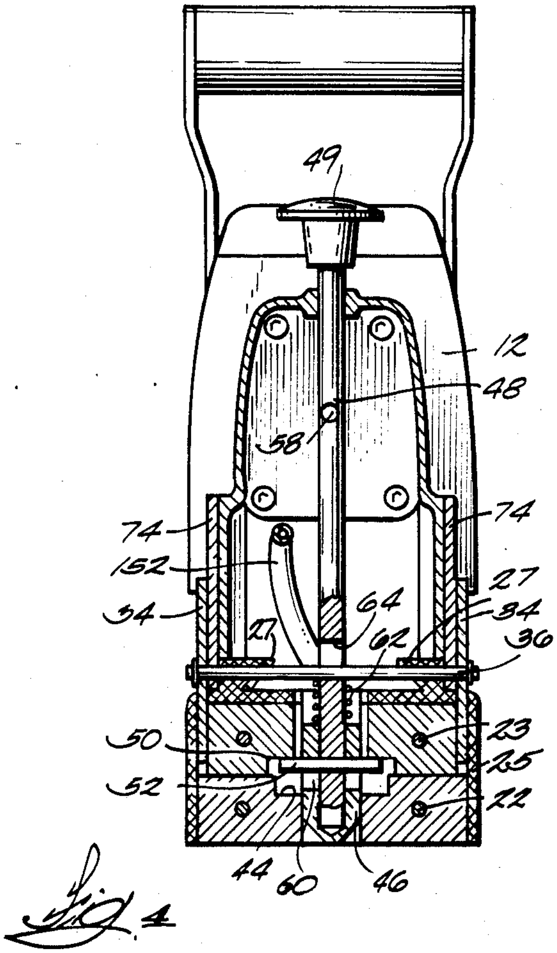
FIG. 4 is a vertical section through FIG. 2 along the switch rod.
Figure 7:
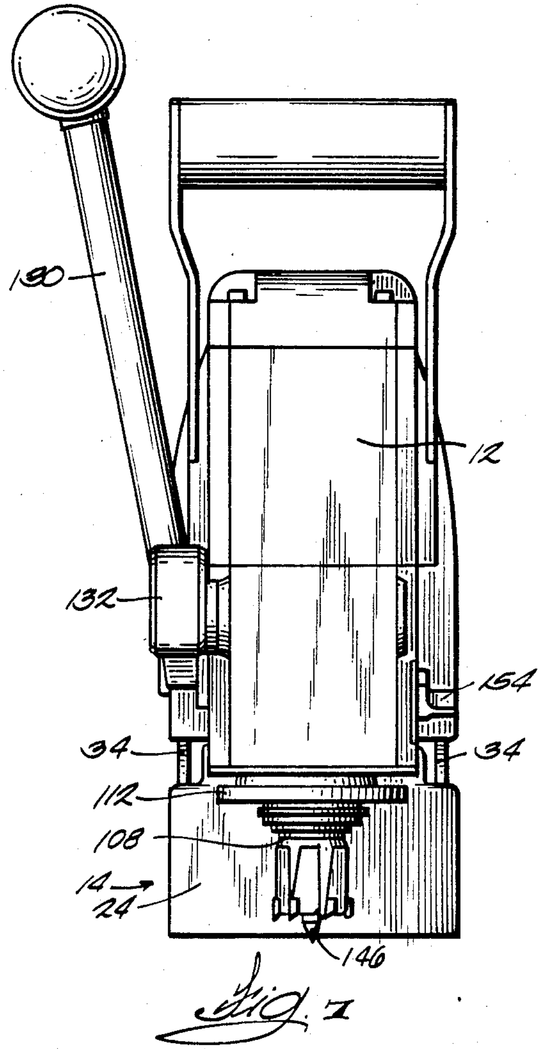
FIG. 7 is an end elevation showing the feed handle and cutter.

Shifting the upper magnetic assembly 28 relative to the lower assembly 26 is controlled by handle 30 which has a hand grip 32 at the distal end of the crank arms 34 straddling the reservoir 16 and pivoted on shaft 36 fixed in the rails 27 of the base extrusion 25 (FIG. 4). The short leg 38 of each crank 34 is received in a slot 40 of a non-magnetic actuating block 42. The actuating block has an elongated central opening 44 through which the sensing probe 46 and switch rod 48 extend. The elongated opening 44 permits the upper magnetic assembly 28 to shift relative to the lower magnetic assembly 26 and relative to the sensor 46 and rod 48.

The non-magnetic block 42 is provided with a transverse groove 50 on the underside permitting cross pin 52 mounted transversely in the switch rod 48 to come up into the groove 50 when the magnetic assembly is active (as shown in FIG. 2). If the upper magentic assembly 28 has been shifted to the right (FIG. 3), the groove is shifted and cannot receive cross pin 52 and switch rod 48 cannot be raised to its upper position to close switch 54 which is a toggle switch having its actuating handle 56 received in hole 58 in the switch rod. Thus, it will be appreciated the upper magnetic assembly 28 must be in the active position (FIG. 2) to permit the switch 54 to be closed to turn on the motor in housing 12.

It will be noted the sensor 46 is reciprocally mounted on the lower end of the switch rod 48 with the transverse rod or stop 52 extending through the hole 60 in the sensor. Thus, the sensor can move relative to the cross pin 52 within the limited range of movement permitted by the cross pin 52 engaging opening 60. The sensor is biased downwardly by spring 62 compressed between the upper end of the sensor 46 and the pin 36 extending through slot 64 in the switch rod 48. It will be appreciated that in the position shown in FIG. 2 the sensor has been pushed upwardly by reason of engagement with a flat surface. This enables the switch rod 48 to be raised, as illustrated, to close the switch 54. If the tool is knocked over or the like so the sensor is no longer pushed into the base by reason of contact with a work surface, the spring 62 will force the sensor downwardly out of the base and that will cause the aperture 60 to pull cross pin 52 down and pull the switch rod 48 down to actuate the toggle switch handle 56 to turn off switch 54 and deenergize the motor.

Figure 1:
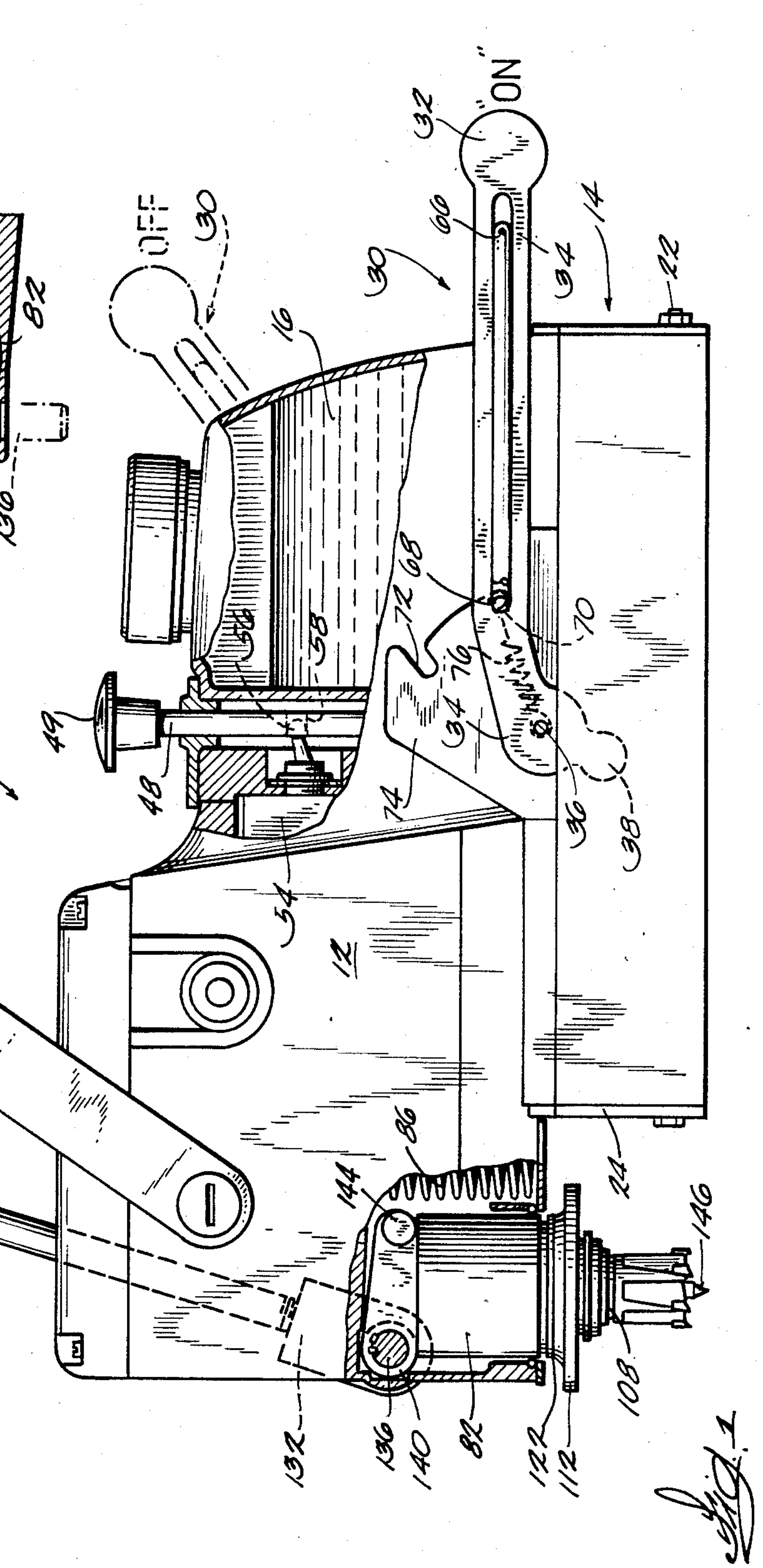
FIG. 1 is a side elevation with part of the housing and coolant reservoir broken away.

When the magnetic assembly is positioned as shown in FIG. 2 and the sensor is retracted, the motor can be energized by lifting the knob 49 on the switch rod 48. The knob 49 is depressed to turn the motor off. The upper magnetic assembly is actuated by actuating lever 30. The lever is locked in either the magnet energized (FIG. 2) or the magnet deenergized position (FIG. 3) by a latch arrangement which includes the U-shaped latch member 66. The cross leg of the U extends through the slots in the crank arms 34 and the open ends are turned in at 68 to engage either the "on" slot 70 or the "off" slot 72 in the side plate 74 (FIG. 1). The in-turned ends 68 are biased into engagement with either of the slots by a tension spring 76. When it is desired to go from the "on" to "off" or from "off" to "on" mode, the cross piece 66 of the latch is pulled rearwardly to disengage the ends 68 from the slot and permit the lever to be actuated. When the cross piece 66 is released, spring 76 will pull the latch ends 68 back into the appropriate slot.

The motor in housing 12 drives spindle 78 (FIG. 8) rotatably mounted in bearing 80 and an upper bearing (not shown). The spindle is not movable axially. A feed collar 82 is mounted on the spindle for axial movement relative thereto. The collar has a rearwardly extending plate 84 fixed thereto with compressed spring 86 biasing the plate and collar upwardly to its upper limit of travel as determined by engagement of the collar with sleeve 88 and/or plate 90.

Collar 82 has a cutter retaining cage 92 rotatably mounted therein. The upper end of the cage 92 is provided with a race for ball bearings 94. The collar is provided with upper and lower races 96, 98 engaging the balls 94 to take a load in either direction. The lower race is biased upwardly by the O-ring 100 compressed by the ring 102 threaded into the collar 82.

The cage 92 has three radial bores receiving retaining balls 104 which engage the groove 106 in the tubular body of the cutter 108. These balls are held in engagement by the cam 110 in the upper inside of release collar 112 which is biased upwardly by spring 114 compressed between the inside flange 116 of the release collar and the snap ring 118 fixed in the lower end of the cage. It will be noted the cam 110 actually has a cylindrical section 120 which engages the balls when they are in operative position engaging the cutter groove. This flat on the ramp prevents any force build-up from feeding back to the ramp and moving the ramp to disengage the balls and thus the lose grip on the cutter.

The release collar 112 is pulled down against the bias of spring 114 to pull the cam 110 down to release the retaining balls 104. This releases the tool. Pulling the release collar down is not as convenient as pushing it up to release but it was found chips building up could push the release collar up and release the tool. Therefore, the pull-down-to-release is preferred.

Means are provided for turning the threaded ring 102 into the seemingly inaccessible spot inside the feed collar 82. When the cutter 108 is removed, the release collar 112 can be pushed upwardly towards the ring, but cannot quite reach the ring because of the O-ring 122 which functions as a spacer preventing the tangs 124 on the upper end of the release collar from engaging the slots 126 on the lower edge of the ring 102. When it is desired to turn the ring, the O-ring 122 is removed to permit the release collar to be moved up far enough for tangs 124 to engage slots 126 in the ring and act as a spanner for turning the ring. After the ring has been turned in enough to compress the O-ring 100 to load the lower race 98, the spacer O-ring 122 is remounted as shown. The cutting tool has an internal groove receiving drive key 128 fixed on the spindle 78. The key drives the cutter.

Figure 10:
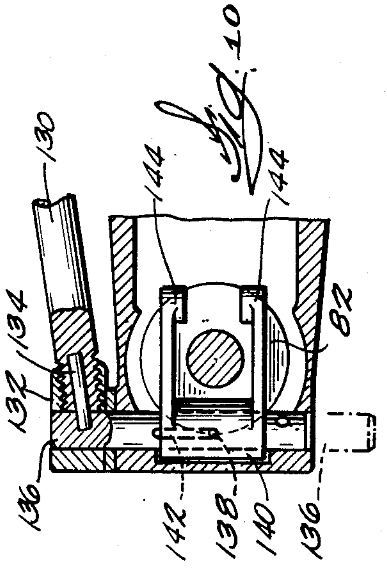
FIG. 10 is a horizontal section showing the tool feed details.

Downward movement of the feed collar 82 (and the cutter) is regulated by the lever 130 threaded into lever collar 132 with drive pin 134 (FIG. 10) captured with its ends received in the lever 130 and in the cross shaft 136. The cross shaft can project from either side of the housing while being limited in its transverse movement relative to the housing by the limit pin 138 threaded through sleeve 140 into the groove 142 in the cross shaft. The cross shaft 136 is keyed to the sleeve 140 by key 143 which has a press fit in the keyway in sleeve 140.

The sleeve 140 is part of the forked actuating mechanism for the collar 82. Thus, the two arms 144 of the actuating cam straddle the spindle and upper portion of the collar to engage the collar (FIG. 10) so that when the lever 130 is moved clockwise (FIG. 1) the ends of the cams 144 press down on the collar 82 in opposition to spring 86 to move the collar downwardly. This moves the cutter and the retention cage downwardly to feed the cutter into the material to be worked on.

The center of the hole to be cut is indicated by the spring loaded center or probe 146 projecting from the lower end of the spindle. The probe 146 is biased downwardly by spring 148 compressed between the internal shoulder in the center bore of the spindle and the upper end of the center and can move upwardly against the bias of the spring 148 as the tool is positioned on the work. The probe can't get any further out of the spindle than the position illustrated by reason of the limit stop 150 fixed in the spindle engaging the end of the groove on the side of the probe. The probe acts as a slug ejector as the cutter is retracted from the work.

Figure 11:
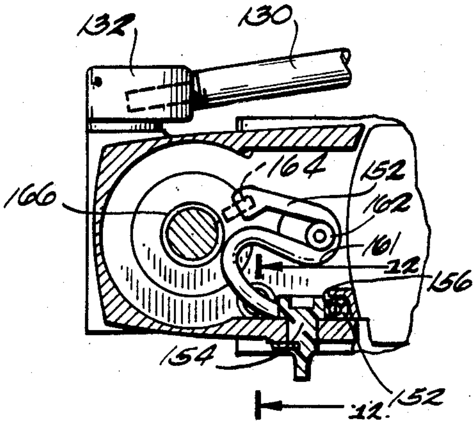
FIG. 11 is a section through the coolant pump and feed.
Figure 12:
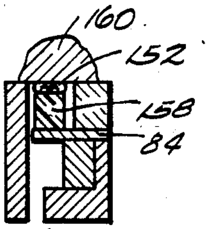
FIG. 12 is a section on line 12—12 in FIG. 11.

Coolant is supplied to the inside of the cutter from the reservoir 16 through a plastic hose 152 mounted therein and extending to the lower right corner (FIG. 2) so that if the machine is mounted in a vertical position the end of the tube will be at the low point of the reservoir. The plastic tube extends up inside the housing past a rotary cam 154 mounted in the housing with an actuating end on the outside of the housing (FIG. 11). Cam 154 squeezes the tube 152 through the metal wear plate 156 to avoid cutting or wearing out the tube. Cam 154 can be rotated to pinch off the tube as desired to regulate the amount of coolant flow to the cutting tool. Thus the cam functions as a flow control. The tube then passes between a resilient post 158 (FIG. 12) carried on the actuating plate 84 and a fixed overhead part 160 of the housing so that when the cutter is in its uppermost position, i.e., not working, the tube 152 is pinched off. When the feed lever 130 is actuated, the resilient pad 158 is pulled away from the tube 52 and flow of coolant can occur. The coolant pump is a peristaltic pump which includes the curved portion 161 against which the tube 152 is squeezed by eccentric cam or roller 162 to effect the peristaltic pumping action. The end of the tube 152 is connected at 164 to manifold 166 (FIG. 8) between the upper and lower O-rings 168, 170 to communicate with the cross bore 172 in the spindle to feed coolant to the axial bore 174 in the spindle and down through a recess in the probe 146 to the inside of the cutting tool. With this arrangement, no coolant flows until the cutter is moved from its uppermost position. The structure permits the flow rate to be adjusted to the requirements prior to starting the cutting operation.

I claim:

1. A portable power tool having a magnetic base incorporating permanent magnets to hold the tool on ferromagnetic material;
   - means for enabling and disabling the magnetic field of said magnetic base,
   - a housing fixed on said base,
   - a rotatable, axially fixed spindle mounted in said housing,
   - an electric motor mounted in said housing and driving said spindle,
   - a cutting tool mounted on said spindle for axial movement relative to the spindle,
   - means controlling axial movement of said cutting tool to and from the material to be cut,
   - said magnetic base including a fixed assembly of permanent magnets separated by ferromagnetic plates,
   - said means enabling and disabling the magnetic field comprising a moveable assembly of permanent magnets separated by ferromagnetic plates and slideable on said fixed assembly between positions of reinforcing and shunting the field of said fixed assembly, said moveable assembly having fewer magnets than the fixed assembly so the base always has a magnetic field effective,
   - a switch controlling operation of said motor,
   - means preventing closure of said switch when said moveable assembly is in said field shunting position,
   - a rod operatively connected to said switch and slideably mounted in said housing and said base,
   - stop means fixed on said rod,
   - said moveable assembly of magnets including a blocking surface engaged by said stop means when said moveable assembly is in said field shunting position,
   - said moveable assembly including a relief aligned with said stop means when said moveable assembly is in said reinforcing position and enabling said rod to be actuated to close said switch as said stop means enters said relief.

2. A power tool according to claim 1 including a sensor mounted on said rod for limited movement relative thereto between a position in which the sensor projects from said base and a position in which it is forced into said base by reason of said base resting on a support surface,
   - a spring biasing said sensor to said projecting position,
   - and means connecting said sensor and said rod to move said rod to open said switch when said sensor is in said projecting position.

3. A portable power tool having a magnetic base incorporating permanent magnets to hold the tool on ferromagnetic material,
   - means for enabling and disabling the magnetic field of said magnetic base,
   - a housing fixed on said base,
   - a rotatable, axially fixed spindle mounted in said housing,
   - an electric motor mounted in said housing and driving said spindle,
   - a cutting tool mounted on said spindle for axial movement relative to the spindle,
   - means controlling axial movement of said cutting tool to and from the material to be cut,
   - a coolant reservoir mounted on said base,
   - means for dispensing coolant from the reservoir onto the cutting tool at a controlled rate during the cutting operation,
   - said dispensing means including a pump and a flow control,
   - means shutting off coolant flow when said cutting tool is in position withdrawn from the material to be cut,
   - a tube between the reservoir and the point where the tube discharges the coolant for delivery to the cutting tool,
   - said pump being a peristaltic pump having a roller squeezing the tube against a wall,
   - said flow control comprising manually operable cam means squeezing said tube,
   - and said shut off means comprises means operative to squeeze said tube.

4. A portable power tool having a magnetic base incorporating permanent magnets to hold the tool on ferromagnetic material, means for enabling and disabling the magnetic field of said magnetic base, a housing fixed on said base, a rotatable, axially fixed spindle mounted in said housing, an electric motor mounted in said housing and driving said spindle, a cutting tool mounted on said spindle for axial movement relative to the spindle, means controlling axial movement of said cutting tool to and from the material to be cut, a tool feed collar reciprocably mounted in said housing, said spindle being rotatable inside said collar, a tool retaining cage rotatably mounted inside said feed collar, tool engaging means carried by said cage, said cutting tool having a sleeve fitting over said spindle, and cam means for moving said tool engaging means to engage said sleeve and to disengage said engaging means from said sleeve.

5. A power tool according to claim 4 including means biasing said cam means to move said engaging means to engage said tool, said cam means including a manually operable release collar.

6. A power tool according to claim 4 in which said means controlling axial movement of said cutting tool includes an actuating cam engaging said feed collar, a cross shaft pivoted in said housing, said cross shaft being slideable on its axis in said housing and being of such length to project from either side of said housing but not from both sides at the same time, said actuating cam being mounted on said cross shaft, a spring biasing said feed collar upwardly away from the work, a handle on the exterior of said housing connected to the exposed end of said cross shaft to control movement of said actuating cam and the feed collar.

* * * * *